United States Patent [19]

Hasegawa

[11] Patent Number: 5,253,287
[45] Date of Patent: Oct. 12, 1993

[54] METHOD OF OPERATING CORDLESS TELEPHONE SYSTEM

[75] Inventor: Yoshisuke Hasegawa, Higashihiroshima, Japan

[73] Assignee: Sharp Kabushiki Kaisha, Osaka, Japan

[21] Appl. No.: 764,234

[22] Filed: Sep. 23, 1991

[30] Foreign Application Priority Data

Sep. 25, 1990 [JP] Japan ................... 2-255728

[51] Int. Cl.⁵ .............. H04M 11/00; H04M 1/64; H04B 1/00
[52] U.S. Cl. .................... 379/61; 379/58; 379/67; 379/88; 455/54.1
[58] Field of Search ............ 379/58, 61, 67, 88, 379/213, 214; 455/54.1

[56] References Cited

U.S. PATENT DOCUMENTS

| | | | |
|---|---|---|---|
| 3,912,875 | 10/1975 | Katz | 379/61 |
| 4,628,152 | 12/1986 | Akerberg | 379/60 |
| 4,744,101 | 5/1988 | Saegusa | 379/61 |
| 4,873,713 | 10/1989 | Yamanouchi et al. | 379/67 |
| 4,881,259 | 11/1989 | Scordato | 379/61 |
| 5,075,894 | 12/1991 | Iwase et al. | 379/67 |
| 5,090,051 | 2/1992 | Muppidi et al. | 379/61 |
| 5,140,629 | 8/1992 | Lee | 379/88 |

FOREIGN PATENT DOCUMENTS

59-70326 4/1984 Japan .
63-182923 7/1988 Japan .

Primary Examiner—Curtis Kuntz
Assistant Examiner—Vijay Shankar

[57] ABSTRACT

A method of operating a cordless telephone system includes the steps of: waiting an incoming call; automatically answering the incoming call and setting the system to a monitoring mode; continuing the monitoring mode as far as it is confirmed that there is a radio connection between a single portable terminal and a main terminal; detecting the termination of communications; and restoring the system to the waiting state in response to the termination of the communications. During a period of monitoring, switching noises are eliminated from monitoring voice because the portable terminals do not transmit data for maintaining the connection to the main terminal in turn.

30 Claims, 8 Drawing Sheets

METHOD OF OPERATING CORDLESS TELEPHONE SYSTEM

BACKGROUND OF THE INVENTION

Field of the Invention

The invention relates generally to a method of operating cordless telephone systems and, more particularly, relates to a method of monitoring voice during automatic answering in cordless telephone systems.

Description of the Related Art

Functions of telephones for domestic use have been highly advanced with development of electronic communication techniques. Among telephone systems, cordless telephone systems have been rapidly developed in recent years.

A cordless telephone system includes a plurality of portable telephone terminals (hereinafter referred to as "portable terminal"), and a main telephone terminal (hereinafter referred to as "main terminal") coupled to the plurality of portable terminals by radio and connectable to telephone lines for administering by radio communications between the telephone lines and the portable terminals.

When the cordless telephone system receives an incoming call, the main terminal radio-transmits an incoming call signal to each portable terminal. Each portable terminal generates a ringing for catching the attention of the user in response to the incoming call signal. If the user happens to be somewhere around, he operates a nearby portable terminal, so that the portable terminal transmits a signal requiring communications to the main terminal. The main terminal, on detecting this request, couples the portable terminal unit which sent the request with the line by radio, thereby enabling voice communication using the portable terminal.

In recent years, cordless telephone systems with automatic answering and automatic recording functions incorporated therein have been commercially available. Such a kind of conventional cordless telephone system includes a main terminal connectable to a telephone line and having one radio equipment thereon, and a plurality of portable transmitter/receivers capable of radio communication with this main terminal. Automatic answering in the conventional cordless telephone system is performed as stated below.

In a waiting state, the main terminal monitors the line to see if there is an incoming call or not. Each portable transmitter/receiver is disabled. When there is an incoming call, the main terminal automatically establishes line connection. The main terminal further transmits a message prepared in advance to a calling party and activates a tape recorder for recording the communication at the same time. The main terminal further sends a command to all the portable transmitter/receivers by radio to bring each transmitter/receiver to a state called "monitoring state". The monitoring state is a state in which voice from the line, which is radio-transmitted from the main terminal, is received, and outputted from a loudspeaker and the voice from the transmitter/receiver is not transmitted to the calling party. In this state, the main terminal transmits the voice communicated through the line to each transmitter/receiver by radio. Each transmitter/receiver supplies the transmitted voice from the loudspeaker.

While the automatic answering and monitoring is being carried out, the transmitter/receivers intermittently transmit to the main terminal in turn, so that the main terminal is notified that the transmitter/receivers are connected to the main terminal. That is, it is possible to confirm on the side of the main terminal that the radio frequency of the main terminal is the same as that of each transmitter/receiver.

In the meantime, the user can monitor the voice from the calling party using the transmitter/receiver if the user is near the transmitter/receiver. If the user wishes to communicate with the calling party as a result of monitoring, the user manipulates the transmitter/receiver to transmit a command representing generation of communication request to the telephone terminal in an intermittent transmitting period assigned to the transmitter/receiver. Information for specifying the transmitter/receiver is also included in the transmitted information.

When the main terminal receives the command representing the communication request from the transmitter/receiver, it releases the monitoring state of other transmitter/receivers to bring the same to a disable state. The main terminal forms a radio communication path with the transmitter/receiver which transmitted the communication request. Furthermore, the main terminal stops automatic recording. In this way, voice communication between the user and the calling party is initiated.

In the conventional cordless telephone system stated above, however, there is a problem as follows at the time of the automatic answering and monitoring: In the above-mentioned system, each portable transmitter/receiver intermittently transmits to the main terminal in turn; switching noises due to intermittent transmission are outputted from the loudspeaker of each transmitter/receiver along with the monitored sound; as a result, in automatic answering and monitoring using the transmitter/receiver, the user is annoyed by the noises supplied from the loudspeaker.

SUMMARY OF THE INVENTION

An object of the present invention is to enhance a tone quality of monitored voice during automatic answering in a cordless telephone system including a plurality of portable telephone terminal devices.

Another object of the present invention is to eliminate noises from monitored voice during automatic answering in a cordless telephone system including a plurality of portable telephone terminal devices.

Still another object of the present invention is to eliminate switching noises, which are involved in a signal intermittently transmitted from each portable telephone terminal device to a main telephone terminal device, from monitored voice during automatic answering in a cordless telephone system including a plurality of portable telephone terminal devices.

Yet another object of the present invention is to make it possible to eliminate switching noises, which are involved in a signal intermittently transmitted from each portable telephone terminal device to a main telephone terminal device, from monitored voice during automatic answering in a cordless telephone system including a plurality of portable telephone terminal devices and to rapidly connect a desired portable telephone terminal device to a calling office when it is required.

A method according to the present invention is for operating a cordless telephone system that includes a main telephone terminal device including a telephone line administration circuit connectable to a telephone line for communicating voice with another terminal through the telephone line. There is a radio communication circuit for sending voice communications held by the telephone line administration circuit with another terminal by radiowaves and receiving radiowaves to send voice information contained in the received radiowaves on the telephone line through the telephone line administration circuit. An and an automatic answering circuit is included for automatically answering an incoming call from another terminal through the telephone line, and a plurality of portable telephone terminal devices each including a voice receiving circuit for receiving and converting the radiowaveforms from the main telephone terminal device to voice and outputting the same. A voice transmitting circuit is used for converting the voice to radiowaves and transmitting the same, and a frequency switching circuit for switching employed radio frequencies of the voice receiving circuit and the voice transmitting circuit. The method includes the steps of: waiting until the telephone line administration circuit detects an incoming call from another terminal through the telephone line; initiating communications with the calling party by automatically answering with the automatic answering circuit and simultaneously setting the main telephone terminal device and the portable telephone terminal devices of the cordless telephone system to a monitoring mode to start monitoring in response to the detection of the incoming call; confirming the establishment of radio connection between a single portable telephone terminal device and the main telephone terminal device and holding the cordless telephone system at the monitoring mode as far as it is confirmed; detecting the end of the voice communications; and restoring the cordless telephone system from the monitoring mode back to the waiting step in response to the detection of the end of the voice communications.

In the method stated above, when there is an incoming call, automatic answering are initiated and communications with the calling office are automatically started. Simultaneously, communication monitoring is made possible in each portable telephone terminal device. Monitoring is carried out as far as it is confirmed that the radio connection between a single portable telephone terminal device and the main telephone terminal device is established. This confirmation is just for the single portable telephone terminal device and the main telephone terminal device. Accordingly, each portable telephone terminal device need not intermittently transmit to the main telephone terminal device in turn to confirm the radio connection. No switching noise is generated involved in an intermittent transmitting process in each portable telephone terminal device and the tone quality of the monitoring voice is enhanced.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

In the embodiments below, a description will be made of a cordless telephone system having three portable transmitter/receivers. The present invention, however, is not limited to this and can also be applied to a cordless telephone system including four or more portable transmitter/receivers.

Figure 1:
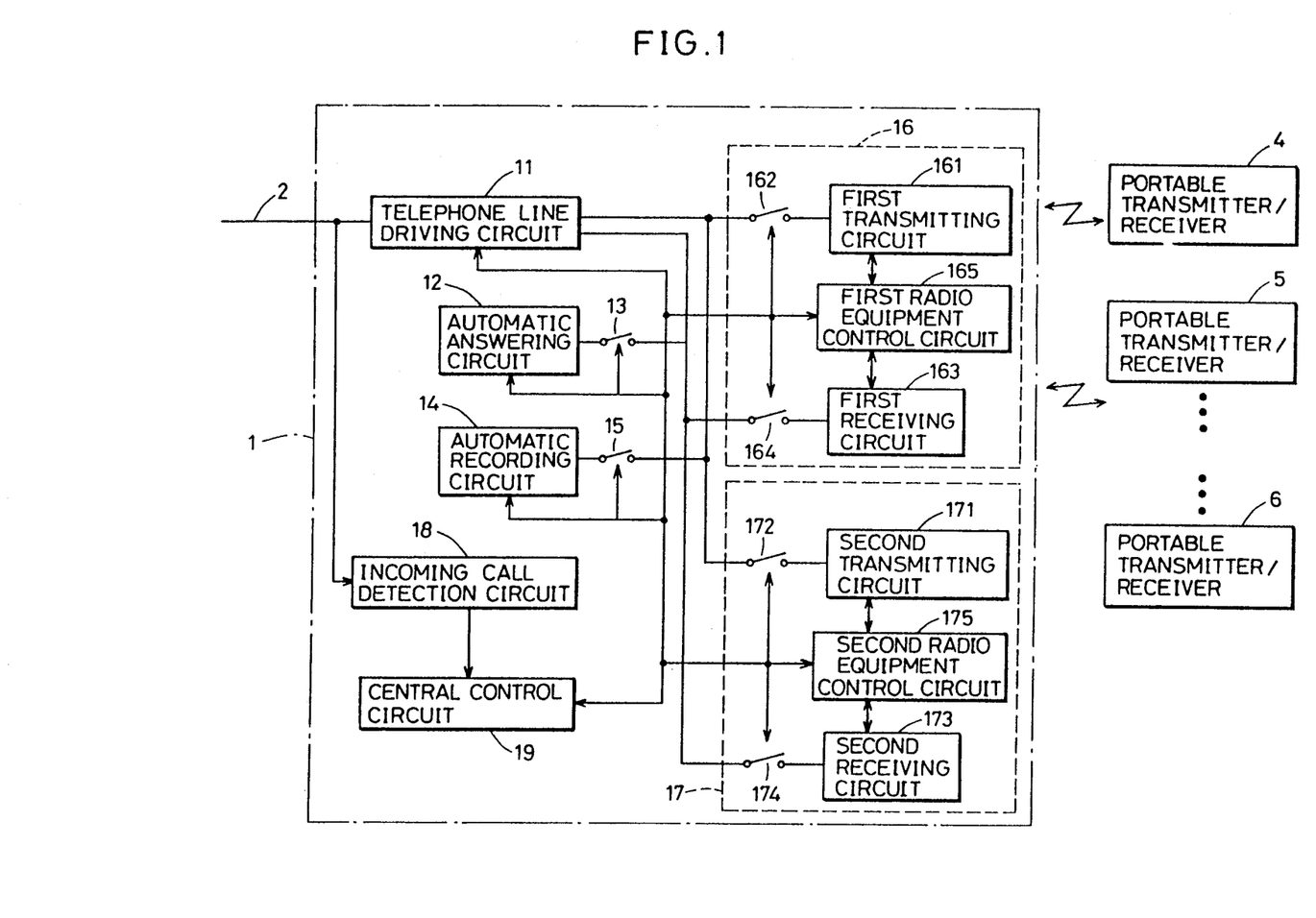
FIG. 1 is a block diagram of a cordless telephone system operated by a method according to the present invention.

Referring to FIG. 1, a cordless telephone system operating in accordance with a method according to the present invention includes a telephone terminal (main terminal) 1 capable of voice communication with a calling party (not shown) through a telephone line 2 and having a function of automatic answering and automatic recording, and three portable transmitter/receivers 4, 5, 6 capable of being connected to main terminal 1 by radio. Main terminal 1 includes a telephone line driving circuit 11 for voice communicating with a telephone of another party (not shown) through telephone line 2; an incoming call detection circuit 18 connected to telephone line 2 for detecting an incoming call from another terminal and supplying an incoming call detection signal; a central control circuit 19 responsive to the incoming call detection signal from incoming call detection circuit 18 and signals from other portions of main terminal 1 for controlling each portion of the main terminal 1; an automatic answering circuit 12 connected to central control circuit 19 for supplying an automatic answering message when there is an incoming call; a switch 13 having its input connected to the output of automatic answering circuit 12 and its output connected to the input of telephone line driving circuit 11 and controlled by central control circuit 19 for selectively connecting the output of automatic answering circuit 12 to telephone line 2 through telephone line driving circuit 11; an automatic recording circuit 14 controlled by central control circuit 19 and capable of recording the contents of voice communications through telephone line 2; a switch 15 having its input connected to telephone line driving circuit 11 and its output connected to automatic recording circuit 15 and controlled by central control circuit 19 for selectively supplying the signal transmitted from telephone line 2 to recording; and first radio equipment 16 and second radio equipment 17 each connected to telephone line driving circuit 11 and central control circuit 19 for communicating voice information and other control signals with portable transmitter/receivers by radio at a predetermined frequency.

First radio equipment 16 includes a first transmitting circuit 161 for transmitting a signal supplied from telephone line 2 through telephone line driving circuit 11 to each portable transmitter/receiver; a first transmission switch 162 having its input connected to telephone line driving circuit 11 and its output connected to first transmitting circuit 161 and controlled by central control circuit 19 for selectively supplying the signal transmitted from a calling party through telephone line 2 and telephone line driving circuit 11 to each portable transmitter/receiver; a first receiving circuit 163 for receiving signals radio-transmitted from each portable transmitter/receiver 4, 5, 6 and supplying the same to telephone line driving circuit 11; a first reception switch 164 having its input connected to the output of first receiving circuit 163 and its output connected to telephone line driving circuit 11 and controlled by central control circuit 19 for selectively supplying the signals transmitted from each portable transmitter/receiver 4, 5, 6 to telephone line 2 through telephone line driving circuit 11; and a first radio equipment control circuit 165 connected to central control circuit 19, first transmitting circuit 161 and first receiving circuit 163 for receiving a command from central control circuit 19 and controlling circuits 161, 163.

Second radio equipment 17, in the same way as first radio equipment 16, also includes a second transmitting circuit 171, a second transmission switch 172, a second receiving circuit 173, a second reception switch 174, and a second radio equipment control circuit 175.

The values of the frequencies of first radio equipment 16 and second radio equipment 17 are selected to be different from each other. For example, in Japan, 89 channels are legally designated as usable frequencies. First radio equipment 16 and second radio equipment 17 employ, for example, 380.85 MHz and 380.4 MHz chosen from these frequencies, respectively.

Figure 2:
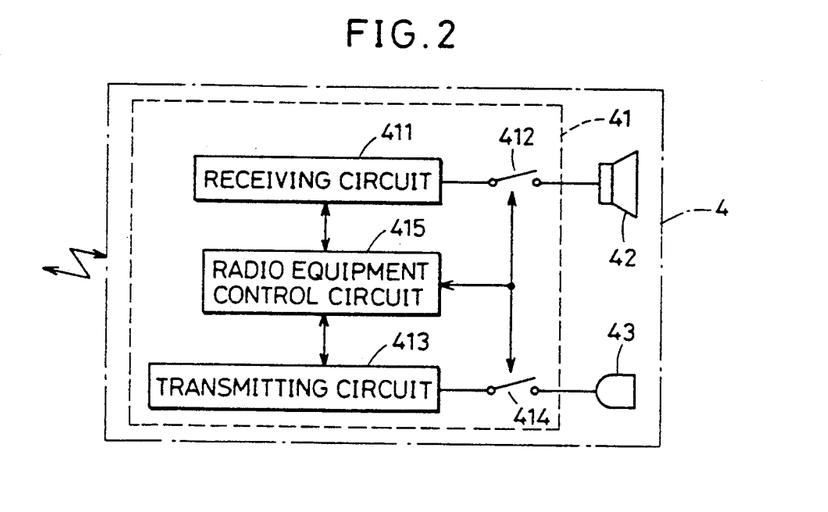
FIGS. 2-4 are circuit block diagrams of portable transmitter/receivers.

Referring to FIG. 2, portable transmitter/receiver 4 includes radio equipment 41 for communicating with main terminal 1 by radio, a loudspeaker 42 connected to radio equipment 41 for supplying voice of the calling party transmitted from main terminal 1, and a microphone 43 for picking up the voice and supplying the same to radio equipment 41 to be transmitted to main terminal 1.

Radio equipment 41 includes a receiving circuit 411 for receiving a signal transmitted from main terminal 1, a switch 412 for selectively supplying the received signal supplied from receiving circuit 411 to loudspeaker 42; a transmitting circuit 413 for transmitting a voice signal from microphone 43 to main terminal 1 by radio, a switch 414 for selectively supplying the output of microphone 43 to transmitting circuit 413; and a radio equipment control circuit 415 connected to receiving circuit 411, switch 412, transmitting circuit 413, and switch 414 for controlling them.

Figure 3:
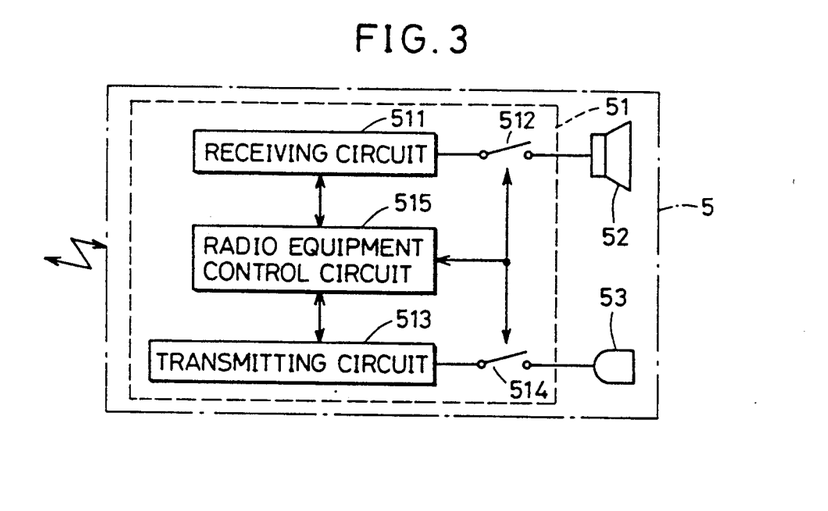
Figure 4:
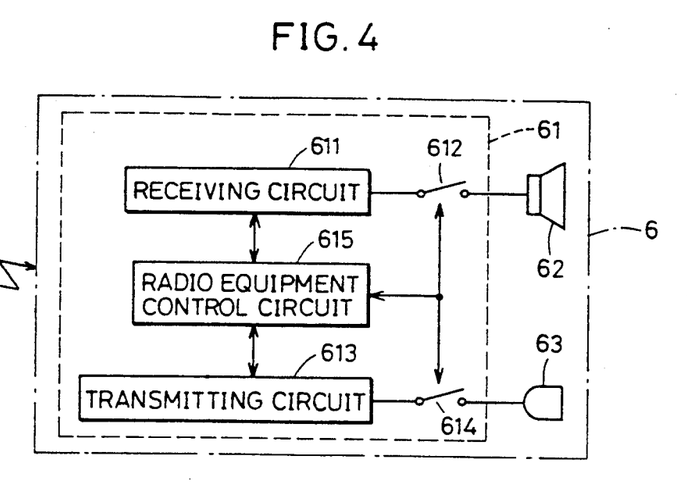

As shown in FIGS. 3, 4, portable transmitter/receivers 5, 6 also have the same structures as that of transmitter/receiver 4. That is, referring to FIG. 3, transmitter/receiver 5 includes radio equipment 51, a loudspeaker 52, and a microphone 53. Radio equipment 51 includes a receiving circuit 511, a switch 512, a transmitting circuit 513, a switch 514, and a radio equipment control circuit 515.

Referring to FIG. 4, transmitter/receiver 6 includes radio equipment 61, a loudspeaker 62, and a microphone 63. Radio equipment 61 includes a receiving circuit 611, a switch 612, a transmitting circuit 613, a switch 614, and a radio equipment control circuit 615.

In FIGS. 2-4, the same reference designations are allotted to corresponding parts. Each of receiving circuits 411, 511, 611 and each of transmitting circuits 413, 513, 613 can be used by switching to either of two frequencies of first radio equipment 16 and second radio equipment 17 of telephone terminal 1 in response to the control of radio equipment control circuits 415, 515, 615, respectively. As such switching is well known in the art, a detailed description thereof will not be made here.

A method of operating a cordless telephone system according to the present invention will now be described referring to block diagrams of the above-mentioned cordless telephone system shown in FIGS. 5-8, flow charts showing the flow of the control of main terminal 1 shown in FIG. 9A and 9B, and flow charts showing the flow of the control of portable transmitter/receiver 4 shown in FIGS. 10A and 10B.

Processing steps of main terminal 1 are given step numbers starting with "a" and processing steps of portable transmitter/receiver 4 are given step numbers starting with "b" in the steps shown in FIG. 9A to 10B.

Figure 9A:
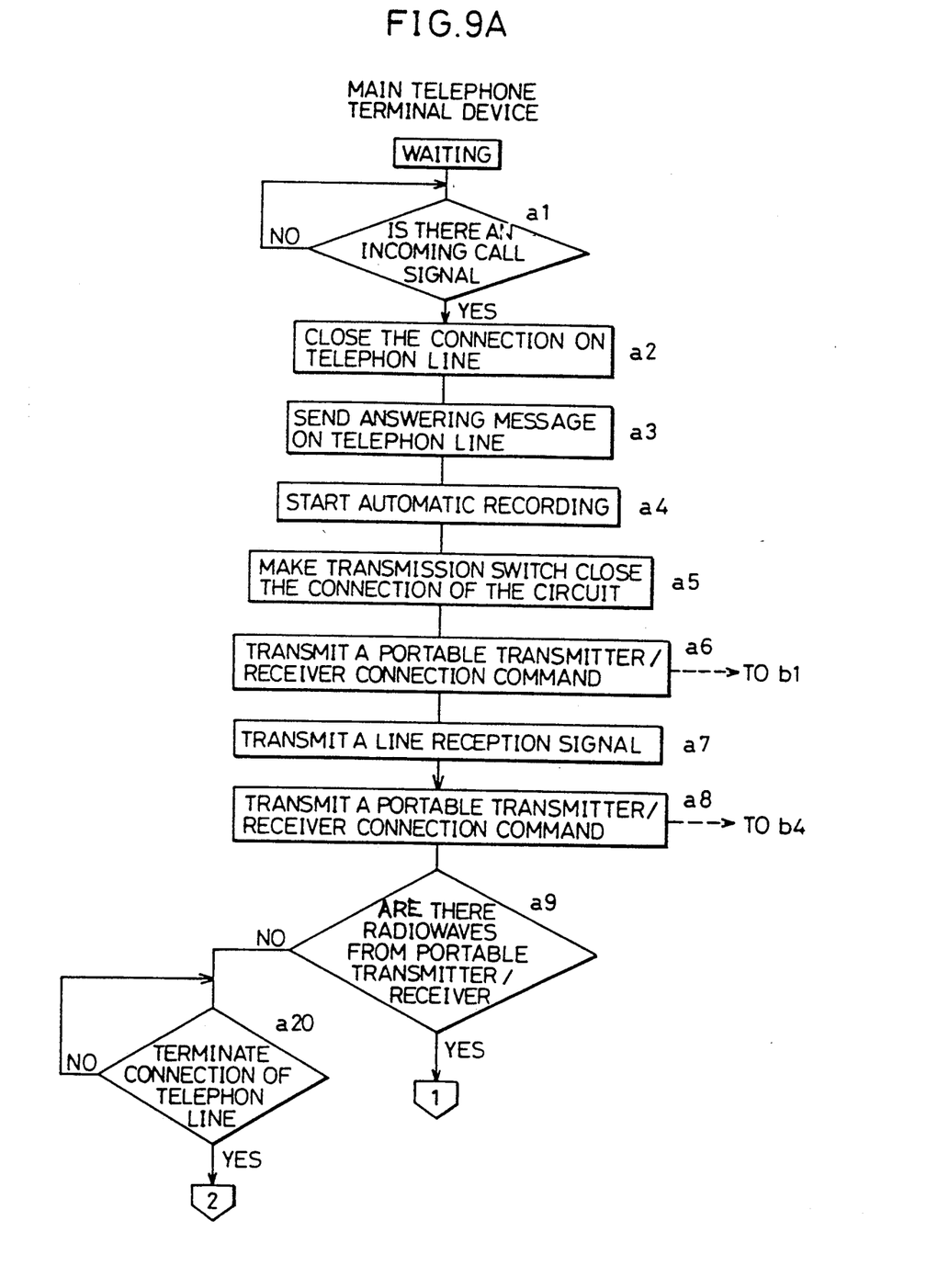
FIGS. 9A and 9B are flow charts showing the flow of control of the main terminal device having automatic answering and recording functions.

Referring to FIG. 9A, in step a1, incoming call detection circuit 18 (FIG. 1) monitors to see if there is an incoming call signal from telephone line 2 (see FIG. 1) or not. If there is no incoming call signal, the control returns to step a1 again and the process of step a1 is repeated until an incoming call is detected. If an incoming call signal is transmitted to main terminal 1 from a calling station (not shown) through telephone line 2, incoming call detection circuit 18 detects this incoming call signal and supplies an incoming call detection signal. The control proceeds to step a2.

In step a2, central control circuit 19 controls telephone line driving circuit 11 in response to the incoming call detection signal and connects main terminal 1 to telephone line 2. The control then proceeds to step a3.

In step a3, circuit 19 makes switch 13 close the connection of the circuit. An answering message supplied from automatic answering circuit 12 is sent on telephone line 2 through telephone line driving circuit 11. The control proceeds to step a4.

In step a4, circuit 19 makes switch 15 close the connection of the circuit. Automatic recording circuit 14 starts recording a voice signal supplied through telephone line 2. The control proceeds to step a5.

In step a5, circuit 19 makes transmission switch 162 of first radio equipment 16 close the connection of the circuit. As a result, the voice signal from telephone line 2 is supplied to transmitting circuit 161. The control proceeds to step a6.

In step a6, circuit 19 instructs radio equipment control circuit 165 to start a connection process of the portable transmitter/receivers. Circuit 165, in response to this instruction, transmits a command to each transmitter/receiver from transmitting circuit 161 by radio, instructing to enter a line monitoring mode. The control of main terminal 1 then proceeds to step a7. Processes in step a7 and thereafter will be described later.

Figure 10A:
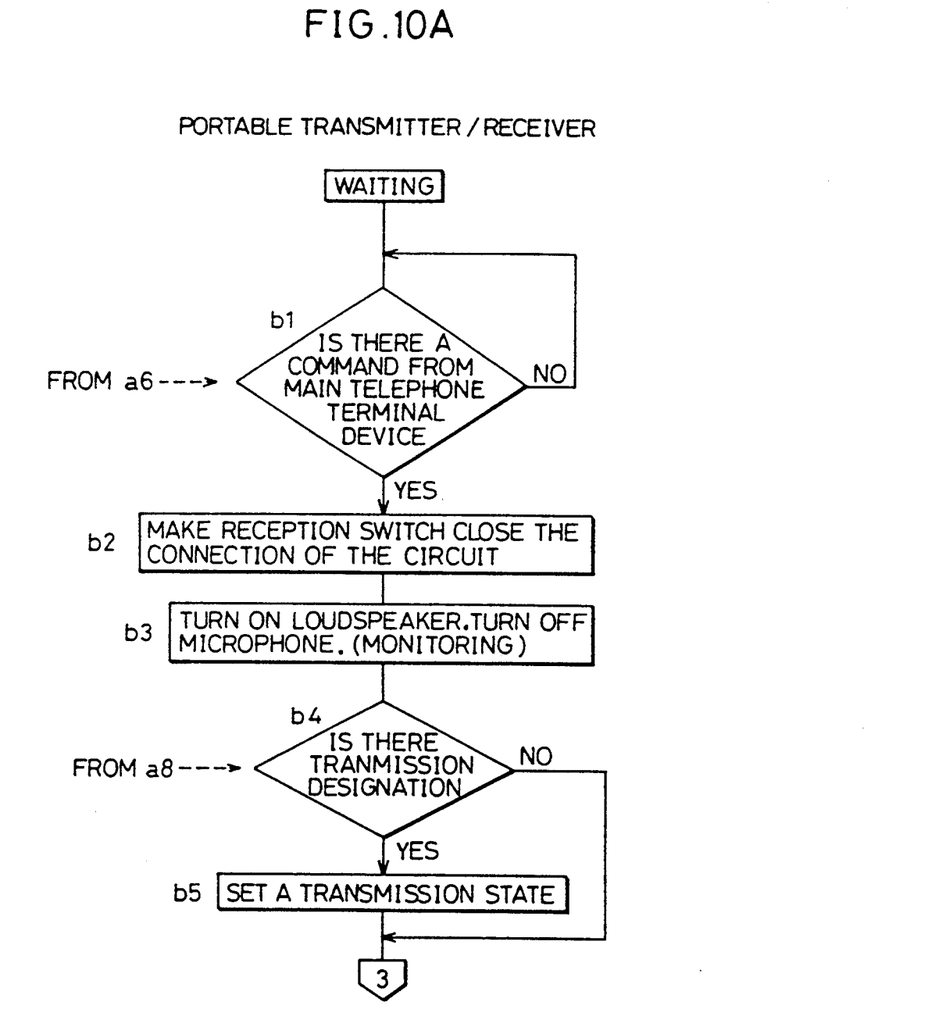
FIGS. 10A and 10B are flow charts showing the flow of control of a portable transmitter/receiver.

Referring to step b1 in FIG. 10A, portable transmitter/receiver 4 and other transmitter/receivers 5, 6 are monitoring to see if a command is transmitted from the telephone terminal. This monitoring process is repeated until a command is transmitted. The control of the transmitter/receiver proceeds to step b2 in response to receipt of a command.

In step b2, radio equipment control circuit 415 makes switch 412 close the connection of the circuit. As a result, the signal received at receiving circuit 411 is supplied to loudspeaker 42. The control proceeds to step b3.

In step b3, radio equipment control circuit 415 turns loudspeaker 42 on. As a result, the voice signal from line 2 is outputted from loudspeaker 42. It is possible for the user to know from whom the incoming call is and what it is about by monitoring the output of loudspeaker 42. Then, radio equipment control circuit 415 turns microphone 43 off. Switch 414 is opened. As a result, voice is not transmitted to main terminal 1 from portable transmitter/receiver 4. The control proceeds to step b4. Processes in step b4 and thereafter will be described later.

Referring again to FIG. 9A, in step a7, central control circuit 19 of main terminal 1 causes first transmitting circuit 161 to radio-transmit the voice signal from telephone line 2. This signal is received by receiving circuits 411, 511, 611 of transmitter/receivers 4, 5, 6 and supplied from loudspeakers 42, 52, 62. That is, the received voice is broadcasted from main terminal 1 to each of transmitter/receivers 4, 5, 6. The control proceeds to step a8.

In step a8, central control circuit 19 transmits a command from first transmitting circuit 161, instructing a specific portable transmitter/receiver, for example, transmitter/receiver 4 in this embodiment, to be connected to telephone terminal 1. Thereafter, the control of the telephone terminal proceeds to step a9.

During broadcasting, main terminal 1 makes a determination as to whether transmitter/receiver is connected to telephone terminal 1 or not. This determination is made by detecting if a signal indicating a connection state has been received from the transmitter/receiver. At the time when monitoring is started, however, of course, each of the transmitter/receivers is not connected to telephone terminal 1. Accordingly, processing as follows is carried out in the processes in steps a9 and thereafter. In step a9, a determination is made as to whether a signal from the transmitter/receiver, indicating the connection state, has been received. If the result of determination is YES, the control proceeds to step a10 shown in FIG. 9B because it is confirmed that the transmitter/receiver is connected to telephone terminal 1. Otherwise, the control proceeds to step a20. Processes in steps a10 and thereafter will be described later.

If the result of the determination in step a9 is NO, the control proceeds to step a20. In this case, since there is no transmission from any of the transmitter/receivers, telephone terminal 1 does not broadcast the contents of communications to the transmitter/receivers. That is, in step a20, central control circuit 19 waits until the connection between the telephone line and another terminal is terminated. When the line connection is terminated, the control proceeds to step a22.

In step a22, the operation of automatic answering and automatic recording is terminated. That is, central control circuit 19 releases switches 13, 15 and stops the operations of automatic answering circuit 12 and automatic recording circuit 19. The control proceeds to step a18. Processes in steps a18 and thereafter will be described later.

Referring again to step b4 in FIG. 10A, a determination is made as to whether a command for the transmitter/receiver has been received or not from main terminal 1 requesting for connection. If the result of the determination is YES, the control proceeds to step b5, and otherwise, the control proceeds to step b6 in FIG. 10B. That is, in this embodiment, the control of transmitter/receiver 4 proceeds to step b5. In the case of transmitter/receivers 5, 6, however, the control proceeds to step b6 in FIG. 10B.

In step b5, a process is carried out in which a transmission is started to main terminal 1 from transmitter/receiver 4 to which a request is made for connection with main terminal 1. Radio equipment control circuit 415 starts transmitting information for maintaining connection with main terminal 1 from transmitting circuit 413 in response to a connection request command supplied from receiving circuit 411. The control proceeds to step b6 in FIG. 10B.

Figure 5:
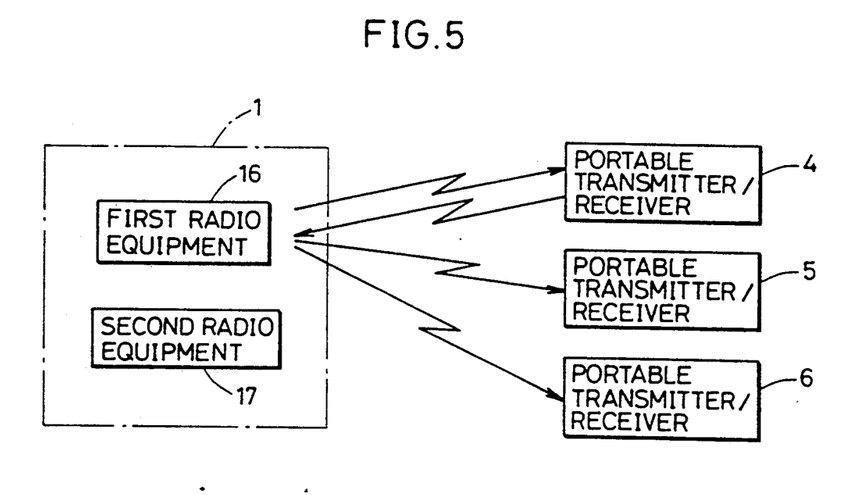
FIGS. 5-8 are block diagrams schematically showing each step of the method of operating the cordless telephone system according to the present invention.

As a result of the above-mentioned series of processes, the manner of communications between main terminal 1 and each of transmitter/receivers 4, 5, 6 becomes such a manner as shown in FIG. 5. Referring to FIG. 5, a voice signal supplied from telephone line 2 is broadcasted from first radio equipment 16 of main terminal 1. Each of transmitter/receivers 4, 5, 6 receives the signal and converts the same into voice and outputs the same. Only transmitter/receiver 4 transmits information for first radio equipment 16, for maintaining the connection. First radio equipment 16 continues transmission of the voice information by detecting this signal. If the user is not near main terminal 1 or any of transmitter/receivers 4, 5, 6, the contents of communications are all recorded by automatic recording circuit 14. As soon as the communications are finished, switches 13, 15 are released and the operations of automatic answering circuit 12 and automatic recording circuit 14 are finished. Broadcasting of the contents of the communication from main terminal 1 is also finished and each of transmitter/receivers 4, 5, 6 is disabled again.

On the other hand, in some cases, the user is near this cordless telephone system and after monitoring the contents of the communications, he decides to communicate with the calling party. A method of operating this system in such a case will be described in the following.

If the user wishes to communicate with the calling party, he puts the nearby transmitter/receiver into an off-hook status. Suppose that transmitter/receiver 6 is utilized in the following. In step b6 of FIG. 10B, a determination is made as to whether there is a request for communication connection by the user. If the result of the determination is YES, the control proceeds to step b7, and otherwise the control proceeds to step b14.

That is, if the off-hooking by the user is not detected in a certain transmitter/receiver, a determination is made in step b14 as to whether or not a command "go into a waiting state" has been received from telephone terminal 1. This command is given to other transmitter/receivers from the telephone terminal when the off-hook is detected in any other transmitter/receiver. If the result of the determination is YES, the control proceeds to step b15, and otherwise, the control returns to step b6.

In step b15, this transmitter/receiver is disabled into a waiting state. For example, referring to FIG. 2, if receiving circuit 411 receives a wait command, this command is supplied to radio equipment control circuit 415. Circuit 415 releases switches 412, 414 and stops the operation of transmitting circuit 413 in response to the command. Accordingly, the state of this transmitter/receiver returns to the first step of FIG. 10A.

Figure 6:
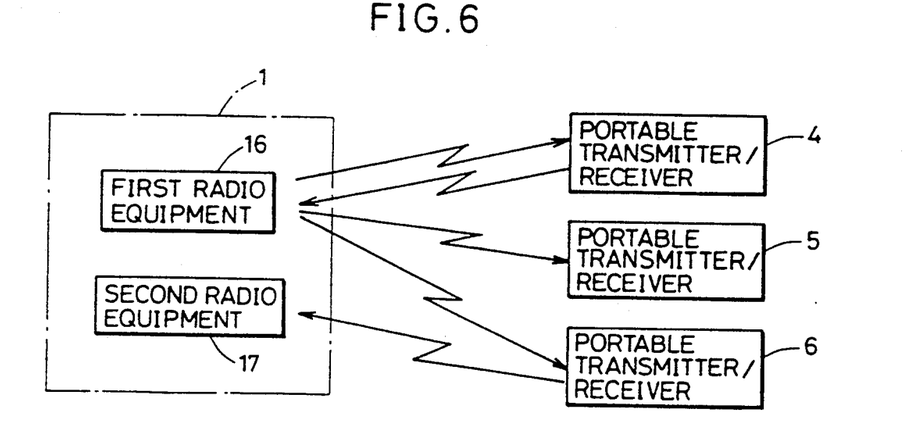

If the control proceeds to step b7 from b6, the transmitter/receiver transmits a command to main terminal 1, requesting for communication connection. In this case the frequency of the second radio equipment 17 of main terminal 1 is employed because first radio equipment 16 is already receiving radiowaves from transmitter/receiver 4. The cordless telephone system in this state is shown in FIG. 6. The control proceeds to step b8. Processes in steps b8 and thereafter will be described later.

Figure 9B:
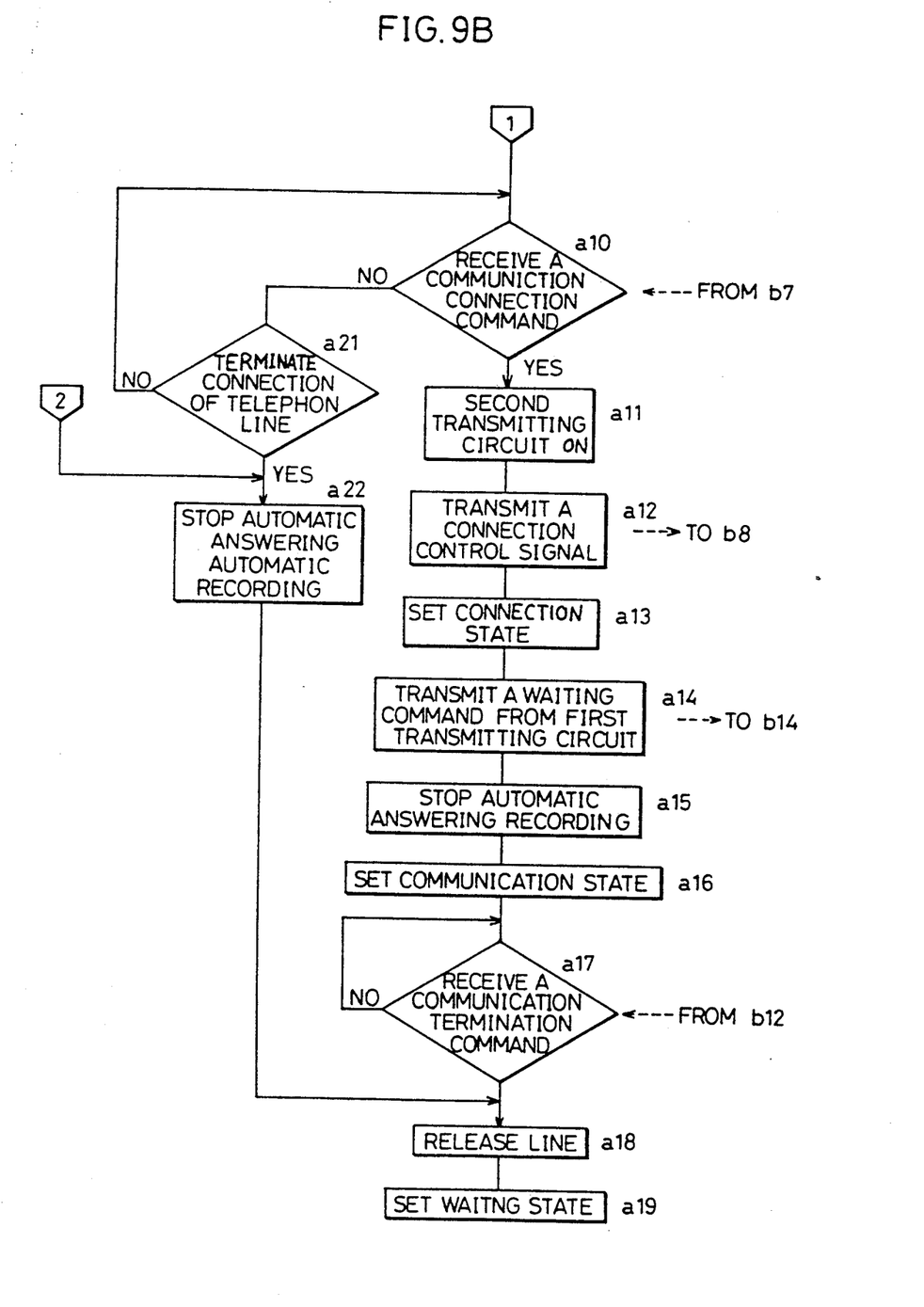

Referring back to step a10 of FIG. 9B, a determination is made as to whether a command requesting for communication connection has been transmitted from any of transmitter/receivers 4, 5,.6 in the second radio equipment control circuit 175 of main terminal 1. If a command requesting for communication connection is received, the control proceeds to step a11. Otherwise the control proceeds to step a21.

In step a11, control circuit 175 turns on the second transmitting circuit 171 to put the same in an operable state. The control proceeds to step a12.

Figure 7:
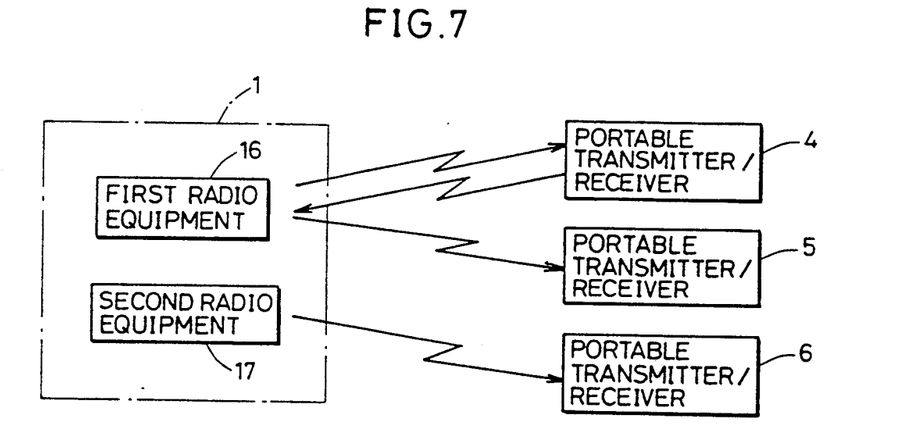

In step a12, control circuit 175 transmits a signal from transmitting circuit 171, for controlling connection with transmitter/receiver 6 which transmitted the communication connection request command. This condition is shown in FIG. 7. The control proceeds to step a13.

If the result of the determination in step a10 is NO, the control proceeds to step a21. In step a21, a determination is made as to whether connection of the telephone line is finished. If the result of the determination is NO, the control returns to step a10. If the result of the determination is YES, the control proceeds to step a22. As the processes in steps a22 and thereafter were described above, a description thereof will not be repeated here.

The processes in step a10 and step a21 are performed until a communication connection request is generated in any of the transmitter/receivers or connection of the telephone line is finished. If the communication connection request is generated, the control proceeds to step a11, and if connection of the telephone line is finished, the control proceeds to step a22.

Referring back to FIG. 10B, a determination is made in step b8 of the transmitter/receiver as to whether a connection control signal to the transmitter/receiver itself has been transmitted from the main terminal. This determination is repeated until the result becomes YES. If the connection control signal is detected, the control proceeds to step b9.

In step a13 of the main terminal and step b9 of the transmitter/receiver, processes are performed for establishing an interconnection. The controls proceed to step a14 and step b10, respectively.

Referring back to FIG. 9B, in step a14, transmitting circuit 161 of radio equipment 16 of telephone terminal 1 transmits a command instructing to go into a waiting state to transmitter/receivers 4, 5 other than the transmitter/receiver 6 which transmitted the command requesting for communication connection. In step b14 of FIG. 10B of the control of transmitter/receivers 4, 5 stated above, this command is received, so that transmitter/receivers 4, 5 other than the one where the communication connection request is generated are brought to a waiting state in the way stated before. After step a14, the control proceeds to step a15.

In step a15, the operations of automatic answering and automatic recording are stopped as follows. Control circuit 175 of the second radio equipment supplies a signal indicating the receipt of the communication connection request command to central control circuit 19. Circuit 19 opens switches 13, 15 and stops the operations of automatic answering circuit 12 and automatic recording circuit 14 at the same time. As a result, the operations of automatic answering and automatic recording are stopped. The control proceeds to step a16.

In step a16, circuit 19 makes transmission switch 172 and reception switch 174 close the connections of the circuit. As a result, the voice signal from telephone line 2 is transmitted by second transmitting circuit 171 to transmitter/receiver 6 where the communication connection request was generated. The voice of the user transmitted from transmitter/receiver 6 is received by second receiving circuit 173 and supplied on telephone line 2. Accordingly, communication between the user and another terminal (not shown) through telephone line 2 is initiated. The control then proceeds to step a17. Processes in steps a17 and thereafter will be described later.

Figure 8:
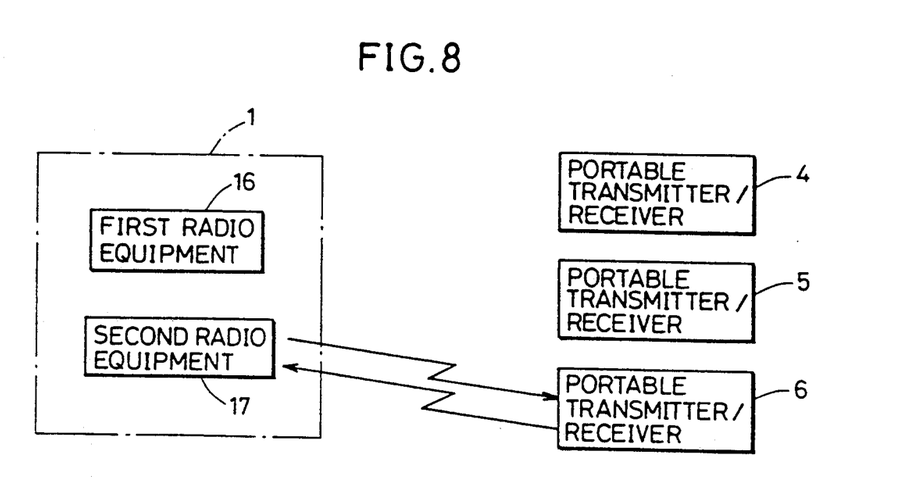
Figure 10B:
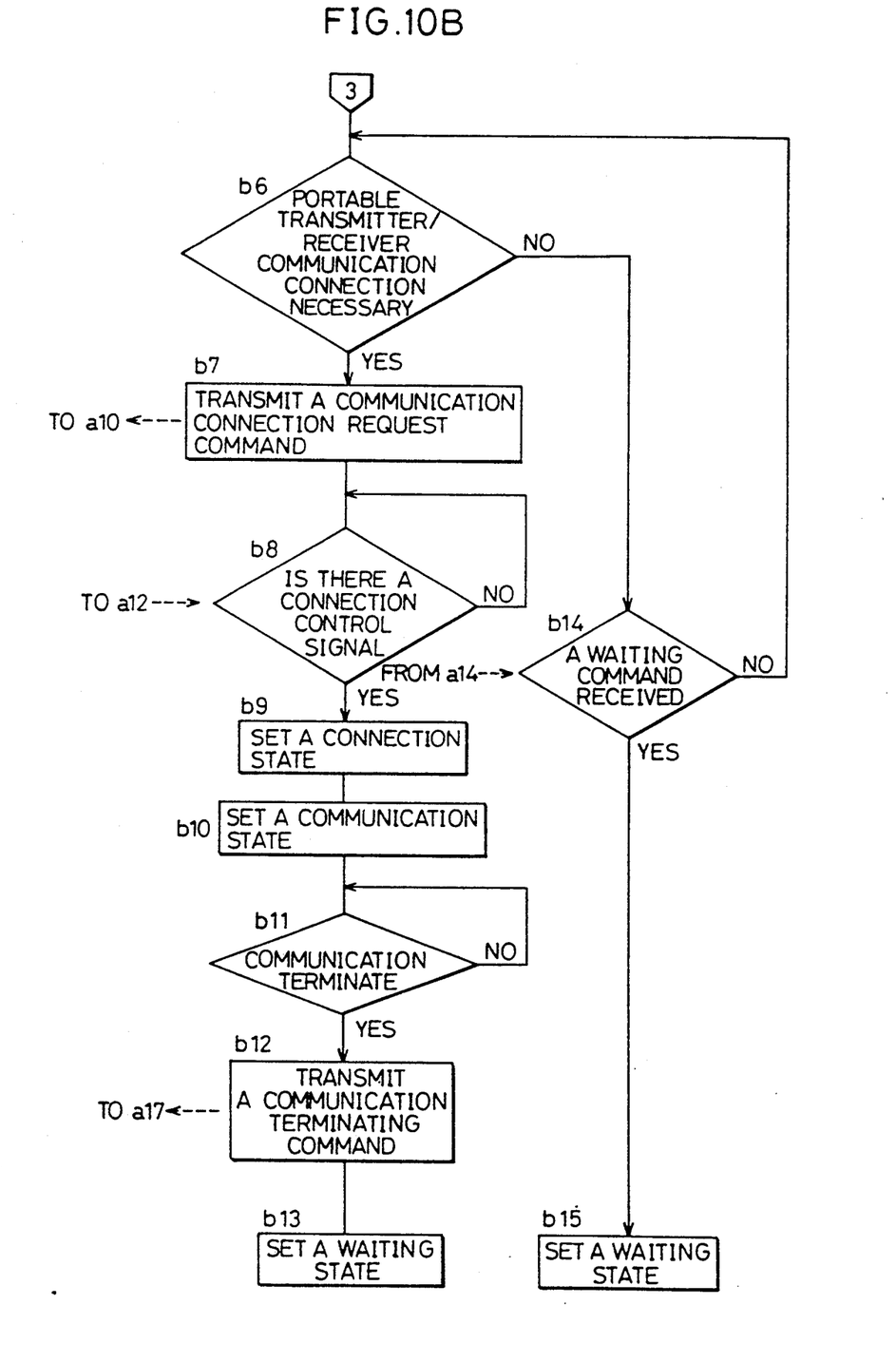

Referring back to step b10 of FIG. 10B, transmitter/receiver 6 (FIG. 4), for example, is connected to the second radio equipment 17 of telephone terminal 1, using receiving circuit 611 and transmitting circuit 613. Therefore, the voice communication between the user and another terminal (not shown) is made possible. In this case, as stated above, all the other transmitter/receivers are kept in an waiting state by the processes of step b14 and step b15. The communication state of this cordless telephone system at that time becomes such a state as shown in FIG. 8. The control proceeds to step b11.

In step b11, it is monitored whether the communications between the user and the calling party (not shown) are finished or not. The determination in step b11 is carried out until the communications are finished and when the result of the determination becomes YES, the control proceeds to step b12.

In step b12, control circuit 615 of transmitter/receiver 6 transmits a communication terminating command using transmitting circuit 613 at the frequency of the first radio equipment of main terminal 1. The control proceeds to step b13.

In step b13, transmitter/receiver 6 puts itself to a waiting state. As a result, transmitter/receiver 6 returns to the first step of FIG. 10A.

Referring back to FIG. 9B, in step a17, control circuit 165 of the first radio equipment monitors to see if a communication terminating command has been transmitted to receiving circuit 163 from transmitter/receiver 6. The monitoring is repeated until the communication terminating command is received. When it is received, the control proceeds to step a18.

Control circuit 165 controls telephone line driving circuit 11 and releases telephone line 2 from main terminal 1. The control proceeds to step a19.

In step a19, central control circuit 19 disables both the first radio equipment 16 and the second radio equipment 17. Incoming call detection circuit 18 resumes the process in which it is monitored if there is an incoming call to telephone line 2. That is, main terminal 1 also brings itself to a waiting state. In this way, main terminal 1 also returns to the step at the head in FIG. 9A.

As a result of the completion of the processes stated above, the whole cordless telephone system returns to a first waiting state of the operation. If there is still another incoming call to telephone line 2, the above-mentioned operation is repeated.

As is obvious from the description above, in accordance with the present invention, the cordless telephone system operates as follows. When there is an incoming call, the main terminal automatically answers and initiates automatic recording at the same time. Furthermore, the main terminal enables all the portable transmitter/receivers using one of the radio equipment and brings one transmitter/receiver to a transmitting-/receiving state and other transmitter/receivers to a receiving-only state. The main terminal broadcasts the contents of communications with another terminal to each transmitter/receiver using the above-mentioned radio equipment. During broadcasting, the control information for maintaining radio connection is transmitted to the main terminal from only one transmitter/receiver. No such process is performed in which a plurality of transmitter/receivers alternately transmit to the main terminal. That is, in the monitoring mode of automatic answering, each transmitter/receiver does not carry out an intermittent transmission process, therefore eliminating a deterioration in the tone quality of the monitored tone due to switching noises.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A method of operating a cordless telephone system, the cordless telephone system including a main telephone terminal device including a telephone line administration means connectable to a telephone line for voice communicating with another terminal through said telephone line, radio communication means for transmitting voice communications held by said telephone line administration means with another terminal by radiowaves, receiving radiowaves, and supplying a voice information contained in the received radiowaves on said telephone line through said telephone line administration means, and automatic answering means for automatically answering an incoming call from another terminal through said telephone line, and a plurality of portable telephone terminal devices including voice receiving means each for receiving and converting the radiowaves from said main telephone terminal device to voice and outputting the same, voice transmitting means for converting the voices to radiowaves and transmitting the same, and frequency switching means for switching the radio frequencies of said voice receiving means and said voice transmitting means, said method comprising the steps of:

waiting until the telephone line administration means detects an incoming call from another terminal through said telephone line;

initiating monitoring by starting communications with a calling party by automatically answering by the use of the automatic answering means and simultaneously setting the cordless telephone system to a monitoring mode in response to the detection of the incoming call;

confirming the establishment of radio connection between only a single one of the portable telephone terminal devices and the main telephone terminal device and holding said cordless telephone system to said monitoring mode as far as it is confirmed;

detecting the terminal of the voice communications; and restoring the cordless telephone system to said waiting step from said monitoring mode in response to the detection of the termination of said voice communications.

2. The method according to claim 1, wherein said step of initiating monitoring comprises the steps of:

establishing line connection between said main telephone terminal device and a call origination station in response to the detection of said incoming call;

enabling said automatic answering means, said voice receiving means of all of said portable telephone terminal devices, and said voice transmitting means of said single one of said portable telephone terminal devices in response to the detection of said incoming call;

setting the frequency of each of said voice receiving means to a first frequency and setting the frequency of an enabled voice communication means to a second frequency; and broadcasting the voice communications with said call origination station through said line by means of a first radio communication means at said first frequency.

3. The method according to claim 2, wherein said step of initiating monitoring further comprises a step of enabling said automatic recording means in response to the detection of said incoming call.

4. The method according to claim 3, wherein said step of enabling further includes enabling a voice recording means of the automatic recording means for recording said voice communications as voice signals.

5. The method according to claim 4, further comprising the steps of:

monitoring if a request for communications with said call origination station is generated in each of said portable telephone terminal devices during said monitoring; and establishing communication connection between said call origination station and said portable telephone terminal device where said request for communications is generated in response to the generation of said request for communications.

6. The method according to claim 5, wherein said step of establishing communication connection includes the steps of:

transmitting a communication request generation signal to said second radio communication means at said third frequency from said portable telephone terminal device where said request for communications is generated; and establishing a radio communication path between said second radio communication means and said portable telephone terminal device where said request for communications is generated in response to said communication request generation signal.

7. The method according to claim 6, wherein said step of transmitting the communication request generation signal includes the steps of:

enabling said voice transmitting means; and switching the frequencies of said voice receiving means and said enabled voice transmitting means to said third and said fourth frequencies, respectively.

8. The method according to claim 7, wherein said step of establishing the radio communication path includes the steps of:

enabling a second radio communication means in response to said communication request generation signal;

transmitting a command instructing to establish said radio communication path to said portable telephone terminal device where said request for communications is generated at said third frequency; and radio-connecting said voice receiving means and said voice transmitting means to said second radio communication means in response to the command instructing to establish said radio communication path in said portable telephone terminal device where said request for communications is generated.

9. The method according to claim 8, further comprising a step of disabling said voice receiving means and said voice transmitting means in each of said portable telephone terminal devices other than said portable telephone terminal device where said request for communications is generated in response to said communication request generation signal.

10. The method according to claim 9, further comprising a step of disabling said first radio communication means in response to said communication request generation signal in said main telephone terminal device.

11. The method according to claim 10, further comprising a step of disabling said automatic answering means in response to said communication request generation signal.

12. The method according to claim 11, further comprising a step of disabling said automatic recording means in response to said communication request generation signal.

13. The method according to claim 12, wherein said restoring step includes the steps of:
disabling said voice transmitting means of each of said portable telephone terminal devices;
setting the frequency of said voice receiving means of each of said portable telephone terminal devices to said first frequency;
disabling said first and second radio communication means; and
starting monitoring a line by said line administration means.

14. The method according to claim 13, wherein said first and second frequencies are the same.

15. The method according to claim 14, wherein said third and fourth frequencies are the same.

16. The method according to claim 15, wherein said cordless telephone system includes three or more of said portable telephone terminal devices.

17. The method according to claim 1, wherein said cordless telephone system includes three or more of said portable telephone terminal devices.

18. The method according to claim 17, wherein said cordless telephone system further includes automatic recording means responsive to the detection of said incoming call for automatically recording voice communications held by said telephone line administration means with another terminal, and
said step of initiating monitoring further includes a step of enabling said automatic recording means in response to the detection of said incoming call.

19. The method according to claim 18, wherein said automatic recording means includes voice recording means for recording said voice communications as voice signals.

20. The method according to claim 19, further comprising the steps of:
monitoring if a request for communications with said call origination station is generated in each of said portable telephone terminal devices during said monitoring; and
establishing communication connection between said call origination station and said portable telephone terminal device where said request for communications is generated in response to the generation of said request for communications.

21. The method according to claim 20, wherein said step of establishing communication connection includes the steps of:

transmitting a communication request generation signal to said second radio communication means from said portable telephone terminal device where said request for communications is generated at said third frequency; and
establishing a radio communication path between said second radio communication means and said portable telephone terminal device where said request for communications is generated in response to said communication request generation signal.

22. The method according to claim 21, wherein said step of transmitting the communication request generation signal includes the steps of:
enabling said voice transmitting means; and
switching the frequencies of said voice receiving means and said enabled voice transmitting means to said third and fourth frequencies, respectively.

23. The method according to claim 22, wherein said step of establishing the radio communication path includes the steps of:
enabling said second radio communication means in response to said communication request generation signal;
transmitting a command instructing to establish said radio communication path to said portable telephone terminal device where said request for communications is generated at said third frequency; and
radio-connecting said voice receiving means and said voice transmitting means to said second radio communication means in response to the command instructing to establish said radio communication path in said portable telephone terminal device where said request for communications is generated.

24. The method according to claim 23, further comprising a step of disabling each of said voice receiving means and said voice transmitting means in response to said communication request generation signal in each of said portable telephone terminal devices other than said portable telephone terminal device where said request for communications is generated.

25. The method according to claim 24, further comprising a step of disabling said first radio communication means in response to said communication request generation signal in said main telephone terminal device.

26. The method according to claim 25, further comprising a step of disabling said automatic answering means in response to said communication request generation signal.

27. The method according to claim 26, further comprising a step of disabling said automatic recording means in response to said communication request generation signal.

28. The method according to claim 27, wherein said restoring step includes the steps of:
disabling said voice transmitting means of each of said portable telephone terminal devices;
setting the frequency of said voice receiving means of each of said portable telephone terminal devices to said first frequency;
disabling said first and second radio communication means; and
starting monitoring of a line by said line administration means.

29. The method according to claim 28, wherein said first and second frequencies are the same.

30. The method according to claim 29, wherein said third and fourth frequencies are the same.

* * * * *